Figure 1:
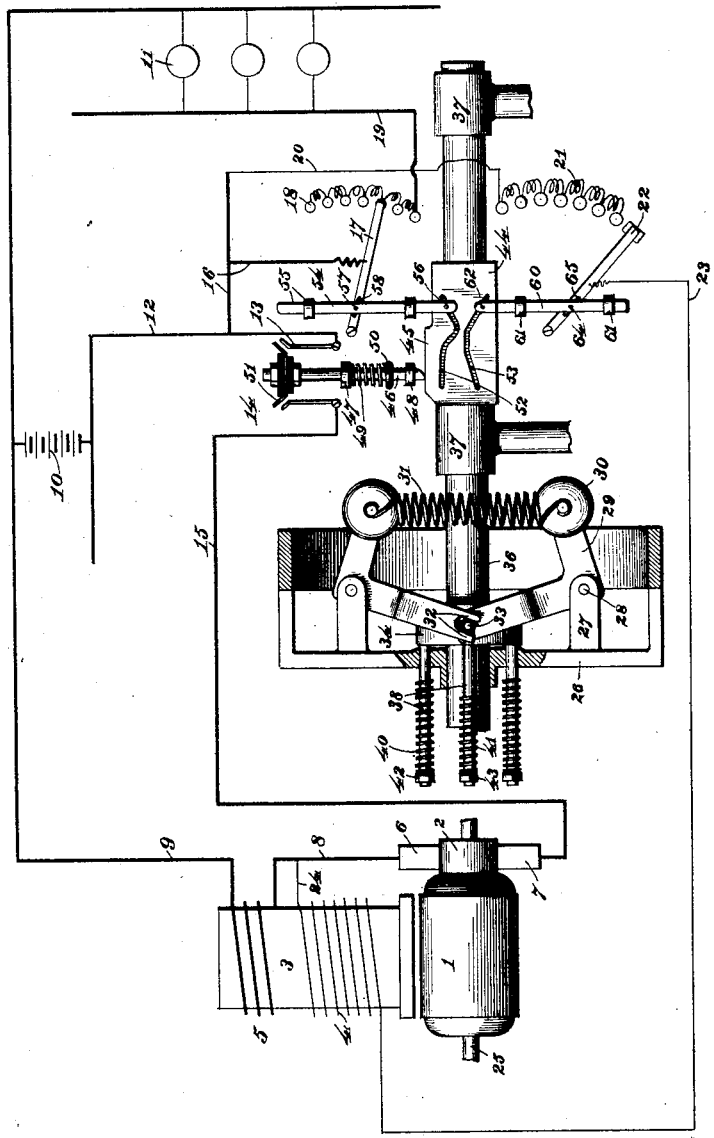

No. 754,429. PATENTED MAR. 15, 1904.
J. L. CREVELING.
MEANS FOR ELECTRICAL DISTRIBUTION.
APPLICATION FILED MAY 10, 1901.
NO MODEL. 2 SHEETS—SHEET 1.

Witnesses
Inventor:
Attorney.

No. 754,429. PATENTED MAR. 15, 1904.
J. L. CREVELING.
MEANS FOR ELECTRICAL DISTRIBUTION.
APPLICATION FILED MAY 10, 1901.
NO MODEL. 2 SHEETS—SHEET 2.
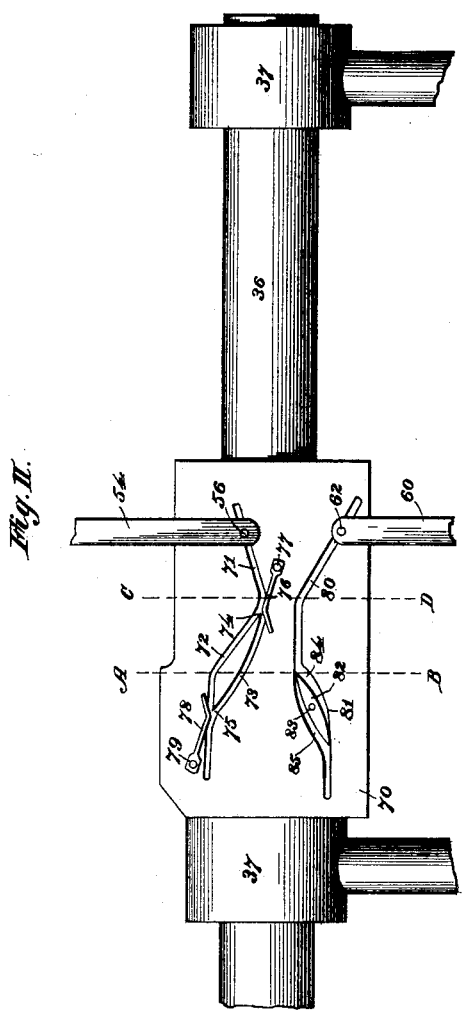
WITNESSES:
INVENTOR:
BY
Attorney.

No. 754,429. Patented March 15, 1904.

UNITED STATES PATENT OFFICE.

JOHN L. CREVELING, OF NEW YORK, N. Y.

MEANS FOR ELECTRICAL DISTRIBUTION.

SPECIFICATION forming part of Letters Patent No. 754,429, dated March 15, 1904.

Application filed May 10, 1901. Serial No. 59,602. (No model.)

*To all whom it may concern:*

Be it known that I, JOHN L. CREVELING, of New York, in the county of New York, State of New York, have invented certain new and useful Improvements in Means for Electrical Distribution, of which the following is a complete specification, reference being had to the accompanying drawings.

The principal object of my invention is to produce improved means for operating an electric-light system from a storage battery as well as from a variable source of supply.

Specifically my invention is designed to afford means for lighting a car by means of electricity generated by power taken from the axle, the axle representing the variable source of supply.

In the accompanying drawings, Figure I is a partially-diagrammatic illustration of my improved apparatus, including illustration, partially in elevation and partially in section, of certain mechanism employed in my system. Fig. II illustrates a portion of the subject-matter of Fig. I, showing a modification.

Referring to the numerals on the drawings, 1 indicates an armature, 2 the commutator, and 3 the field-magnet, of any suitable type of dynamo or generator. In this instance the generator is shown as provided with a field-energizing coil 4 and a differential series coil 5.

6 indicates the positive brush of the generator, and 7 the negative brush thereof, it being assumed that the generator is one that has a uniform direction of rotation. This assumption is made in order to simplify the description of the apparatus; but it is well understood in the art that through the employment of a suitable form of pole-changer a change in the direction of rotation of the armature might readily be provided for.

8 indicates a lead carried from the brush 6 to one terminal of the series coil 5, from the other end of which a main 9 leads to the positive pole of a storage battery 10 and beyond it to one side of the translating devices or lamp system 11. From the negative pole of the battery 10 a main 12 leads to a switch-contact 13, from whose companion switch-contact 14 a lead 15 is carried to the negative brush 7. A wire 16 electrically connects the main 12 with a lever 17, that is adapted to sweep across the contacts of the variable resistance 18, which is connected, as from one of said contacts, by a main 19 with that side of the lamp system 11 opposite to the one with which the main 9 is connected.

20 indicates a wire or similar conductor which connects the main 12 with one of the contacts of a variable resistance 21, across which and into and out of contact with which is adapted to sweep a lever 22. The lever 22 is connected with one terminal of the field-coil 4, as by a wire 23, the other terminal of said coil being connected with a lead 8, as by a wire 24.

It is obvious from the foregoing description and illustration herein referred to that the position of the lever 17 with respect to the contacts of the variable resistance 18 determines the amount of resistance inserted in the lamp or translating circuit and that the position of the lever 22 determines whether or not the field-exciting circuit shall be energized and, if energized, the amount of resistance placed in said circuit.

25 indicates the shaft of the generator, to which is fixed a frame or shell 26, provided with arms or lugs 27, to which are pivotally mounted, as indicated at 28, bell-crank levers 29, carrying upon their outer extremities ponderable heads or balls 30.

31 indicates a spring uniting the balls and tending to draw them together. One or more springs may be employed, as required. The ends of the levers 29, which are opposite to those carrying the balls 30, are preferably bifurcated and are provided with jaws 32, that engage, respectively, pins 33, extending radially from opposite sides of a sleeve or collar 34. This collar is mounted revolubly upon the shaft 36, which is in coaxial alinement with the shaft 25, but connected therewith only through the instrumentality of the collar 34 and its attached members. The shaft 36 is longitudinally movable in fixed bearings 37, provided for it. Rods 38, preferably four in number, passing loosely through apertures in the shell 26, provided for them, are secured to the collar 34 and have coiled about them outside of the shell 26 coiled springs 40 and 41, which being arranged in pairs are adapted to bear at one end against the outside of the shell 26 and are secured, respectively, at their opposite ends, as by nuts 42 and 43, by which, respectively, their resistance may be regulated. With this arrangement it is obvious that the various positions of the collar 34 during the different speeds of rotation of the centrifugal governor—to wit, the loaded levers 29—are dependent upon the adjustment of the various springs above described.

Upon the shaft 36, preferably between the bearings 37, is mounted a guide-block 44. It being attached to the shaft 36 is subject to all its movements, and is provided with a raised portion 45. Upon the raised portion 45 normally rests a rod 45, which, carried in bearings 47 and 48, is pressed toward the guide-block 44, as by a coiled spring 49, seated at one end against the bearing 47 and at the other against a fixed collar 50 upon the rod 46.

51 indicates a contact member secured and insulated upon the end of the rod 46. It is adapted to make and break circuit through the contacts 13 and 14 when motion of the block 44 shall be such that its elevated portion 45 moves beyond the end of the rod 46. It is evident that by this means the circuit from the generator through the battery may be closed at any predetermined speed of rotation of the generator.

The block 44 is provided with slots or keyways 52 and 53. A rod 54, working in bearings 55, is provided with a pin 56, that works in the slot 52. A pin 57 in the rod 52 works in the slot 58 in the lever 17. Consequently lateral motion imparted to the shaft 36 is adapted to actuate the lever 17 and cause it to move across the contacts of the variable resistance 18. A rod 60, working in bearings 61, is provided with a pin 62, that works in the slot 53. It is also provided with a pin 64, which, working in a slot 65 in the lever 22, is adapted to impart to said lever a movement across the contacts of the variable resistance 21 in like manner as the rod 54 actuates the lever 17.

In Fig. II of the drawings I illustrate modified means for actuating the rods 60 and 54 and through them respectively the levers 22 and 17. In a device of the class to which my invention belongs and which is operated by a centrifugal governor the function of the various parts requires the expenditure of more or less energy when any motion is imparted to the several members. Moreover, a centrifugal governor will work only within certain limits of accuracy. For instance, if the contrifugal governor causes the block 44 to travel a certain distance at a certain speed it should do this every time this speed is reached and will do so within the limits of practical requirements; but if a certain speed has been attained and it then be somewhat decreased the governor will not, owing to friction, return with the block to the position it would have taken had the speed last mentioned been given it from a state of rest. In other words, there is a constant lag if the governor is at work properly on an increase of speed when a decrease takes place, and the modification shown in Fig. II of the drawings is designed to overcome the ill effects of the lagging tendency referred to. In Fig. II the shaft 36, with its bearings 37, is illustrated. The shaft is provided with a block corresponding to the block 44, but which for the purposes of distinction is identified by the reference-numeral 70. 71 indicates a slot corresponding to the slot 52, in which the pin 56 moves. The slot 71 is divided through a portion of its length into slots 72 and 73, which unite at the points 74 and 75, respectively. Opposite the point 74 is a guide-spring 76, secured to the block, as indicated at 77, and opposite the point 75 is a guide-spring 78, secured to the block, as indicated at 79. Upon the block 70, in place of the slot 53 of the block 44, I employ a slot 80, in which the pin 62 of the rod 60 travels. The slot 80 is beyond the line A B enlarged to accommodate a guide-piece 82, pivoted to the block 71 within the enlarged portion of the slot 80, as indicated at 83. The guide-piece 82 is held normally, as by a spring, (not illustrated,) in the position shown in the drawings. Its function, like that of the spring-guides 76 and 78, is to guide the pin 62 through the different passages 84 and 85 with the movements of the shaft 36 in opposite directions. Any means of accomplishing the result of changing the direction of movement of the pins 56 and 62 might be substituted for those employed; but those are preferred as being simple and effective.

The operation of my system is as follows: Assuming the generator to be at rest and the members of the system to be in the several positions illustrated in Fig. I of the drawings, if the armature start to revolve centrifugal force actuating the balls 30 will through their levers 29 tend to move the shaft 36 in a direction away from the generator. It is obvious that until the shaft 36 shall have been caused to move no current will be wasted by flowing from the battery through the generator, because the main circuit is broken by want of contact between the contact member 51 and the contacts 13 and 14, and the field-circuit is broken by want of contact between the lever 22 and the variable resistance 21. In the initial position above assumed the battery will supply current to the lamps 11 through a small portion of the resistance 18, giving a voltage upon the lamp-line a little lower than across the battery-mains. As the speed of the armature increases the shaft 36 moves, and through the connection between its block 44 and rod 60 the lever 22 will be actuated first to make contact with the resistance 21 and then by continued movement to gradually cut out the resistance. The movement of the block 44, cutting out the resistance 21, simultaneously acts upon the rod 54 to cut out the small resistance in the lamp-circuit by causing the lever 17 to sweep across the contacts of the resistance 18. Consequently when a line drawn across the block 44, as indicated at C D, shall coincide with the pins 56 and 62 the total field resistance will have been cut out and also the small amount of lamp resistance, the latter to compensate for the drop in the battery and the battery-line due to supplying current to the field-exciting coil. In this position the generator has a full field, and at a slight increase in speed the raised portion 45 of the block 44 may be made to clear the end of the rod 46, whereupon the main circuit from the generator to the battery is closed. The exact speed required for the closing of the main circuit may be adjusted by the relative positions of the raised portion 45 and the rod 46, but is preferably adjusted by means of the springs 40. By this means it is easy to adjust the speed at which the contact member 51 shall make contact with the contacts 13 and 14, so that the main circuit will be completed when the electromotive force of the generator shall be practically equal to that of the battery. At the closing of the main circuit little if any current will flow from the generator through the battery, the electromotive force of the generator and battery being substantially equal, and it will still be desirable to maintain the full field upon the generator until its full current output shall be attained. For that reason some further movement of the block 44 should be allowed before resistance is inserted in the energizing-circuit. This result is accomplished by allowing the block 44 to travel, as indicated, between the lines C D and A B without giving the rod 60 any appreciable movement in its bearings 61. During this travel of the block 44 the generator is assumed to be going from its minimum to its maximum load, and consequently the voltage upon the lamp-mains would tend to rise approximately to the voltage of the machine; but the slot 52 is so shaped that during this travel external resistance is inserted in the lamp-line by the movement of the lever 17 across the contacts of the resistance 18. The degree of resistance thus inserted may be so proportioned as to hold the voltage upon the lamp-mains practically constant, provided, of course, that the lamp-load be constant. An increase of speed in the armature beyond the point at which the block had made the pins 62 and 56 to reach the position on the block 44 indicated by the line A B would tend to increase the electromotive force of the generator and of course the amount of current output, which, if increased, would be undesirable. Therefore the slot 53 is so shaped that further movement of the shaft 36 beyond the line last indicated shall cause the lever 22 to move across the contacts of the resistance 21 and insert regulating resistance in the field-circuit. The increase in speed necessary for inserting this resistance may be adjusted, as by means of the springs 41 and nuts 43, inasmuch as these springs, being shorter than the springs 40, do not come into play until the line A B coincides with the centers of the rods 54 and 60. If this last-mentioned increase in speed cause the proper regulation of the field, the voltage of the machine will be held practically constant, and therefore the pressure upon the lamp-mains will be practically constant, and movement of the lever 17 during this period would be unnecessary unless it were merely to give it a slight motion for the natural rise in voltage of the battery after having received some charging-current. A very slight change of the position of the lever 17 is accomplished by the shape given to the slot 52, as illustrated. Should the speed of the generator now fall, resistance would be cut out of the field-circuit until the machine was supplied with a full field. A further drop in speed beyond this point would leave the machine with full field, but would withdraw part of the lamp resistance, inasmuch as the voltage of the generator would suffer some drop with the fall of speed. When a certain point was reached where the voltage of the generator and battery would be about equal, the regulating resistance of the lamp-circuit would be withdrawn, while the generator would still have full field. A drop in speed below this point would cause the contact member 51 to break contact, which would break connection between the battery and armature, thereby avoiding back discharge through the armature. A further slowing down would cause increase of resistance in the field-circuit by the movement of the lever 22, and also by movement of the lever 17 a slight increase of resistance in the lamp-circuit. These relative movements of the levers 17 and 22, with their consequent regulation of the resistance, are provided to compensate for the rise in voltage in the lamp-mains due to the lessening of the current taken from the battery for the field. Should the generator come to a stop, the block 44 would assume the position shown in the drawings, when all connection between the field-coil and the battery would be broken and a small resistance would be left in the lamp-line. It may be observed that the gradual insertion of resistance in the field-circuit before breaking the connection absolutely prevents all vicious sparking or other bad effects due to self-induction of the coil. Should the armature start again after reaching a stop, as last described, the above-outlined operation would be repeated.

The operation of the device shown in Fig. II is similar to that already described; but in it provision is made for additional movements of the pins 56 and 62 to meet conditions which exist in practice. Referring to said figure for further explanation, if the speed of the generator increase, so that the shaft 36 be moved from left to right, the pin 56 in the slot 71 will strike the guide-spring 76 and be guided thereby into the slot 72. The inclination of that slot will cause the pin 56 to take considerable vertical movement as compared with the lateral displacement of the block 70 until the full amount of resistance due to the movement of the lever 17 is inserted. Now if the block 70 be moved back from the position it would occupy after the generator had attained its limit of speed toward its original position, as it would be by decrease of speed, the pin 56 will be guided in such backward movement into the slot 73 by reason of engagement of the pin 56 with the spring-guide 78. Consequently the pin 56 in the backward movement of the block 70 follows a different course than that pursued by it in the forward movement, and correspondingly different motions are imparted to the rod 54 and through it to the lever 17. A comparison of the shape of the slots 72 and 73 will indicate that the backward movement of the pin 56 and the consequent fall of the lever 17 is more gradual than the movement imparted by the slot 72 and that the fall of the lever 17 begins in advance of the point at which it would begin to fall if the pin 56 traveled in both directions through the slot 72. Obviously such shape may be imparted to the slots 72 and 73 as to give to the lever 17 or resistance-inserting device any desired travel in one direction or the other. In the slot 80 another means for accomplishing the same result and which I consider preferable is illustrated. It consists of the spring-actuated pivoted guide-piece 82. It is obvious that the movement of the shaft 36 from left to right will cause the pin 62 to travel through the passage 84 and that after the end of the guide-piece 82 is passed the reverse movement will cause the pin 62 to return through the passage 85. By this means different directions of travel of the pin 62 may be imparted as desired.

The blocks 44 and 70 are representative of any suitable members for imparting requisite movement to the movable members actuated by their engagement with the grooves in the respective blocks. By the term "block" I do not limit myself to any special shape of member, nor do I limit myself to the manner of converting the motion imparted to it or to the kind of movements so imparted.

What I claim is—

1. The combination with a generator, battery and translating devices, in electrical communication one with the other, of two variable resistances, one in the main circuit and the other in the field-circuit, movable members coöperative therewith, respectively, make-and-break mechanism in the main circuit, and common means for actuating said members and said make-and-break mechanism.

2. The combination with a generator, battery and translating devices, in electrical communication one with the other, of a pair of variable resistances, one in the main circuit and the other in the field-circuit, movable members coöperative with said resistances, respectively, a block movable proportionately to the rate of speed of the generator, and keyways operatively connected with said movable members and shaped to impart to them, respectively, the movements required, substantially as set forth.

3. The combination with a generator, battery and translating devices, in operative communication one with the other, of a pair of variable resistances, one in the main circuit and the other in the field-circuit, a pair of movable members coöperative with said resistances, respectively, an endwise-movable shaft operatively connected with said members, centrifugally-actuated mechanism upon the armature-shaft of the generator, operatively connected with the endwise-movable shaft, and means for controlling the centrifugal mechanism and thereby fixing the critical speeds of the generator.

4. The combination with a generator, battery and translating devices in electrical communication one with the other, of a pair of variable resistances, one in the main circuit and the other in the field-circuit, movable members coöperative with said resistances, respectively, a block movable proportionately to the rate of speed of the generator, means for actuating said movable members, respectively, through the movement of the block, and means for imparting different movements thereto through the movements in opposite directions of the block.

5. The combination with a generator, storage-battery and translating devices, in operative communication one with the other, of a pair of variable resistances, one in the main circuit and the other in the field-circuit, a pair of movable members coöperative with said resistances, respectively, an endwise-movable member operatively connected with said movable members, centrifugally-actuated mechanism varying in speed with the armature-shaft of the generator, and operatively connected with the endwise-movable member, and a plurality of successively-operative springs for controlling the centrifugal mechanism and operating at the critical speeds of the generator.

6. The combination with a generator, battery and translating devices in electrical communication one with the other, of a pair of variable resistances, one in the main circuit and the other in the field-circuit, movable members coöperative with said resistances, respectively, a block movable proportionately to the rate of speed of the generator, keyways operatively connected with said movable members and shaped to impart to them, respectively, the movements required, and means for causing said movable members to follow one set of keyways when the block moves in one direction and another set when the block moves in the opposite direction.

7. The combination with a generator, battery and translating devices in operative communication one with the other, of a pair of variable resistances, one in the main circuit and the other in the field-circuit, a pair of movable members coöperative with said resistances, centrifugally-actuated mechanism operated by the armature-shaft, and means for causing the said members to move with a variable increment or decrement, as considered with regard to the motion imparted by the centrifugal mechanism.

In testimony of all which I have hereunto subscribed my name.

JOHN L. CREVELING.

Witnesses:
 FREDERICK E. KESSINGER,
 DONALD McG. GREGORY.